(12) United States Patent
Oku et al.

(10) Patent No.: US 10,883,632 B2
(45) Date of Patent: Jan. 5, 2021

(54) THREADED JOINT FOR STEEL PIPES

(71) Applicants: Nippon Steel & Sumitomo Metal Corporation, Tokyo (JP); Vallourec Oil and Gas France, Aulnoye-Aymeries (FR)

(72) Inventors: Yousuke Oku, Tokyo (JP); Masaaki Sugino, Tokyo (JP); Fumio Ota, Tokyo (JP)

(73) Assignees: Nippon Steel Corporation, Tokyo (JP); Vallourec Oil and Gas France, Aulnoye-Aymeries (FR)

( * ) Notice: Subject to any disclaimer, the term of this patent is extended or adjusted under 35 U.S.C. 154(b) by 79 days.

(21) Appl. No.: 16/078,172

(22) PCT Filed: Feb. 23, 2016

(86) PCT No.: PCT/JP2016/000963
§ 371 (c)(1),
(2) Date: Aug. 21, 2018

(87) PCT Pub. No.: WO2017/145192
PCT Pub. Date: Aug. 31, 2017

(65) Prior Publication Data
US 2019/0040978 A1 Feb. 7, 2019

(51) Int. Cl.
*E21B 17/042* (2006.01)
*F16L 15/06* (2006.01)
(Continued)

(52) U.S. Cl.
CPC .......... *F16L 15/04* (2013.01); *E21B 17/0423* (2013.01); *F16L 15/002* (2013.01);
(Continued)

(58) Field of Classification Search
None
See application file for complete search history.

(56) References Cited

U.S. PATENT DOCUMENTS

| | | | | |
|---|---|---|---|---|
| 4,893,844 A | * | 1/1990 | Chelette | ............... E21B 17/042 285/113 |
| 5,415,442 A | * | 5/1995 | Klementich | ........ E21B 17/0423 285/331 |

(Continued)

FOREIGN PATENT DOCUMENTS

| | | |
|---|---|---|
| CA | 2686880 C | 4/2015 |
| WO | 88/07619 A1 | 10/1988 |

*Primary Examiner* — Matthew Troutman
*Assistant Examiner* — Douglas S Wood
(74) *Attorney, Agent, or Firm* — Banner & Witcoff, Ltd.

(57) ABSTRACT

A threaded joint is constructed of a pin and a box. The pin includes, in order from an end of the pin toward the tubular body: a first male threaded portion, a first sealing surface, a shoulder surface, a second sealing surface, and a second male threaded portion. The box includes a first female threaded portion, a first sealing surface, a shoulder surface, a second sealing surface, and a second female threaded portion. A length from a boundary of the first sealing surfaces to a position of the shoulder surfaces and a length from a boundary of the second sealing surfaces to a position are each at least 15 mm, and the total length which is a sum of the length and the length is at least 50 mm. Thus, the threaded joint is capable of providing excellent sealing performance.

8 Claims, 4 Drawing Sheets

(51) Int. Cl.
  *F16L 15/00*  (2006.01)
  *E21B 17/08*  (2006.01)
  *F16L 15/04*  (2006.01)
  *F16L 15/08*  (2006.01)
  *F16L 58/18*  (2006.01)

(52) U.S. Cl.
  CPC ............... *F16L 15/06* (2013.01); *F16L 15/08* (2013.01); *F16L 58/182* (2013.01); *F16L 15/004* (2013.01)

(56) References Cited

U.S. PATENT DOCUMENTS

| | | | |
|---|---|---|---|
| 6,581,980 B1 * | 6/2003 | DeLange | ............... E21B 17/042 285/334 |
| 7,690,696 B2 | 4/2010 | Mallis et al. | |
| 9,388,925 B2 * | 7/2016 | Juarez | ................... E21B 17/042 |
| 2006/0145480 A1 | 7/2006 | Mallis et al. | |
| 2012/0043756 A1 | 2/2012 | Elder et al. | |

* cited by examiner

THREADED JOINT FOR STEEL PIPES

TECHNICAL FIELD

Related Applications

This application is a National Stage Application under 35 U.S.C. 371 of co-pending PCT application PCT/JP2016/000963 designating the United States and filed Feb. 23, 2016 which is hereby incorporated by reference in its entirety.

BACKGROUND ART

In oil wells, natural gas wells, and the like (hereinafter also collectively referred to as "oil wells"), steel pipes referred to as oil country tubular goods (OCTG) are used for extraction of underground resources. The steel pipes are sequentially connected to each other, and threaded joints are used for the connection.

Threaded joints for steel pipes are classified into two types: coupling-type joints and integral-type joints. A coupling-type threaded joint is constituted by a pair of tubular goods that are connected to each other, of which one is a steel pipe and the other is a coupling. In this case, the steel pipe includes male threaded portions formed on the outer peripheries at both ends thereof, and the coupling includes female threaded portions formed on the inner peripheries at both ends thereof. Thus, the steel pipe and the coupling are connected to each other. An integral-type threaded joint is constituted by a pair of steel pipes as tubular goods that are connected to each other, without a separate coupling being used. In this case, each steel pipe includes a male threaded portion formed on the outer periphery at one end thereof and a female threaded portion formed on the inner periphery at the other end thereof. Thus, the one steel pipe and the other steel pipe are connected to each other.

In general, the joint portion at the tubular end where a male threaded portion is disposed is referred to as a pin because it includes an element that is inserted into a female threaded portion. On the other hand, the joint portion at the tubular end where a female threaded portion is disposed is referred to as a box because it includes an element that receives a male threaded portion. Pins and boxes both have a tubular shape because they are constituted by end portions of tubular goods.

In recent years, more and more oil wells have been drilled very deep underground or in ultra-deep water. In such environments, multiple strings of OCTG are installed for efficient development of the oil well. For connection of OCTG in a multiple string structure, threaded joints of the type in which the outside diameter of the box is substantially equal to the outside diameter of the pin are widely used. This is because enlargement of the box outside diameter of the inside OCTG is restricted by the pin inside diameter of the outside OCTG due to the necessity of the clearance between the inside OCTG and the outside OCTG on the multiple strings structure. Under these constraints, threaded joints are required to exhibit excellent sealing performance against pressure from the inside (hereinafter also referred to as "internal pressure") and pressure from the outside (hereinafter also referred to as "external pressure").

For example, threaded joints of the type employing a tapered threaded portion with dovetail threads, sometimes referred to as wedge threads, are known to be able to provide excellent sealing performance. Wedge threads are configured as follows. The load flanks and the stabbing flanks each have a negative flank angle, and the load flanks contact each other and the stabbing flanks contact each other at the completion of thread fastening. This allows firm engagement of the threaded portions as a whole. Furthermore, in a fastened state, the crests of the threaded portion are in intimate contact with the roots thereof. Thus, threaded joints employing wedge threads are considered to be able to provide excellent sealing performance because no clearances are provided in the threaded portion.

U.S. Pat. No. 7,690,696 (Patent Literature 1) and United States Patent Application Publication No. 2006/0145480 (Patent Literature 2) each disclose a threaded joint employing wedge threads for the threaded portion.

The threaded joint of Patent Literature 1 is configured as follows. The threaded portion is divided into two portions along the pipe axis and a shoulder portion is provided at the boundary between the two stepwise threaded portions. A surface-to-surface seal portion is provided adjacent the shoulder portion. The threaded joint of Patent Literature 1 was designed to provide improved sealing performance by means of a locking effect produced by the combination of clearance-free, engaging contact of wedge threads and pressure contact between shoulder surfaces.

However, in the case of the threaded joint of Patent Literature 1, the design tolerances are set within a small range both for the threaded portion with wedge threads and for the shoulder portion in order to achieve tight contact without clearances in a fastened state. As a result, not only the manufacturing costs are increased but also the machined dimensions may fall outside the tolerances. If out-of-tolerance condition occurs, the locking effect is not sufficiently produced, and therefore sealing performance as desired may not be provided.

The threaded joint of Patent Literature 2 is configured such that a shoulder portion and a seal portion are provided at the boundary between two stepwise threaded portions as with the threaded joint of Patent Literature 1. In addition, in one of the two stepwise threaded portions, clearances are provided between load flanks, between stabbing flanks, between crests and roots, or the like. With such a configuration, the design tolerance to be set for the threaded portion can be larger. As a result, it is possible to reduce the manufacturing costs and to easily obtain machined dimensions within the tolerances.

However, the threaded joint of Patent Literature 2 has only one surface-to-surface seal portion. Thus, in the case where excessively high pressures (internal pressure and external pressure) are applied to the threaded joint, it may not be able to maintain its sealing performance. In particular, if the threaded joint is of the type in which the outside diameter of the box and the outside diameter of the pin are substantially equal, it is difficult to ensure sealing performance because, in addition to the above reason, enlargement of the wall thicknesses of the pin and the box is restricted.

CITATION LIST

Patent Literature

Patent Literature 1: U.S. Pat. No. 7,690,696

Patent Literature 2: United States Patent Application Publication No. 2006/0145480

SUMMARY OF INVENTION

Technical Problem

An object of the present invention is to provide a threaded joint for steel pipes capable of reliably providing excellent sealing performance.

Solution to Problem

A threaded joint for steel pipes according to an embodiment of the present invention includes a tubular pin and a tubular box, the pin and the box being fastened by screwing the pin onto the box. The threaded joint is configured as follows.

(i) The box has an outside diameter less than 110% of an outside diameter of a tubular body having the pin.

(ii) The pin includes, in order from an end of the pin toward the tubular body: a tapered first male threaded portion with dovetail threads; a first sealing surface; a shoulder surface; a second sealing surface; and a tapered second male threaded portion with dovetail threads.

(iii) The first sealing surface comprises: a first tapered surface; and first curved surfaces at both ends of the first tapered surface. The second sealing surface comprises: a second tapered surface; and second curved surfaces at both ends of the second tapered surface. A length L1 along the pipe axis is a distance from a boundary between the first tapered surface and the first curved surface at the near side of the end of the pin to the shoulder surface, the length L1 along the pipe axis is at least 15 mm. A length L2 along the pipe axis is a distance from a boundary between the second tapered surface and the second curved surface at the near side of the tubular body of the pin to the shoulder surface, the length L2 along the pipe axis is at least 15 mm. A total length L which is a sum of the length L1 and the length L2 is at least 50 mm.

(iv) The box comprises, in order from the tubular body toward an end of the box: a tapered first female threaded portion with dovetail threads; a first sealing surface; a shoulder surface; a second sealing surface; and a tapered second female threaded portion with dovetail threads.

(v) In the above threaded joint, in a fastened state:

The shoulder surfaces are in contact with each other, the first sealing surfaces are in contact with each other, and the second sealing surfaces are in contact with each other;

Clearances are provided between stabbing flanks of the first male threaded portion and stabbing flanks of the first female threaded portion, and clearances are provided between roots of the first male threaded portion and crests of the first female threaded portion or between crests of the first male threaded portion and roots of the first female threaded portion;

Clearances are provided between stabbing flanks of the second male threaded portion and stabbing flanks of the second female threaded portion, and clearances are provided between roots of the second male threaded portion and crests of the second female threaded portion or between crests of the second male threaded portion and roots of the second female threaded portion.

In the above threaded joint, each of the clearances between the crests and the roots is preferably in a range of 0.10 mm to less than 0.20 mm.

The above threaded joint is preferably configured such that: an angle formed by the shoulder surfaces with respect to the pipe axis in a longitudinal section along the pipe axis is 75 to 105°.

In the above threaded joint, the total length L is preferably at most 90 mm.

In the above threaded joint, a first threaded portion is constituted by the first male threaded portion and the first female threaded portion, and a second threaded portion is constituted by the second male threaded portion and the second female threaded portion, the first threaded portion and the second threaded portion each preferably comprising a single-start thread or a double-start thread.

Advantageous Effects of Invention

A threaded joint for steel pipes according to the present invention has significant advantages as follows: being capable of reliably providing excellent sealing performance.

DESCRIPTION OF EMBODIMENTS

Figure 1:
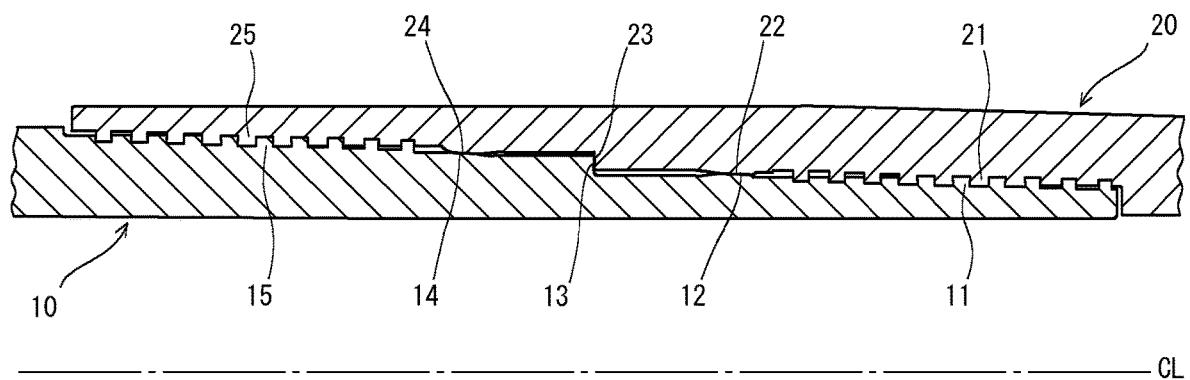
FIG. 1 is a longitudinal sectional view of a threaded joint for steel pipes according to an embodiment of the present invention.

As described above, in threaded joints for steel pipes, enlargement of the box outside diameter is restricted, and thus threaded joints of the type in which the outside diameter of the box is substantially equal to the outside diameter of the pin are widely used. This type of threaded joints are often provided with a surface-to-surface seal portion in order to ensure sealing performance.

In a conventional threaded joint, for example, an internal seal portion is provided adjacent the free end of the pin, and an external seal portion is provided adjacent the free end of the box (the end opposite to the end adjacent the tubular body having the box). The internal seal portion, located closer to the interior, primarily contributes to sealing performance against internal pressure. The external seal portion, located closer to the exterior, primarily contributes to sealing performance against external pressure. Two stepwise threaded portions are provided in regions between the internal seal portion and the external seal portion. Furthermore, a shoulder portion is provided at the boundary between the two stepwise threaded portions. The threaded portions are, for example, tapered threaded portions employing buttress threads.

In conventional threaded joints of this type, the wall thickness of the pin is thin and the wall thickness of the box is thin in the respective regions of the seal portions (the internal seal portion and the external seal portion, respectively). This is because the seal portions need to be provided in the free end regions of the pin and the box in such a manner as to ensure sufficient areas of the critical sections of the pin and the box. The term "critical section" as used herein refers to a cross section at an end of the engagement region of the threaded portion where the area of its cross section for bearing tensile loads is a minimum. The position of the critical section and the cross-sectional area thereof are factors in determining the tensile strength of the threaded joint.

If the wall thicknesses in the regions of the seal portions are thin, the regions of the seal portions may undergo excessive deformation when excessively high pressure (internal pressure and external pressure) has been applied to the threaded joint, and consequently the threaded joint may not be able to maintain its sealing performance.

In contrast, in the threaded joint of Patent Literature 2, excessive deformation of the region of the seal portion upon application of pressure can be inhibited. This is because, in the threaded joint of Patent Literature 2, the seal portion is provided adjacent the shoulder portion at the boundary between the two stepwise threaded portions, and therefore the pin and the box can have a sufficient wall thickness in the regions of the seal portions.

In addition, the threaded joint of Patent Literature 2 employs a threaded portion having dovetail threads. In one of the two stepwise threaded portions thereof, clearances are provided between load flanks, between stabbing flanks, between crests and roots, or the like. This means that the threaded portion is not in a state of engaging in intimate contact without clearances over the entire area thereof.

Here, it is to be noted that threaded joints having a threaded portion with wedge threads in which clearances are not provided (e.g., the threaded joint of Patent Literature 1) pose the following problems. During thread fastening, engaging in intimate contact in the threaded portion occurs prior to shouldering (abutment between the shoulder surfaces). As a result, tightening torque becomes excessive at the time of shouldering, which leads to trouble in the fastening operation. In addition, at the completion of thread fastening, the threaded portion is already in a state of sufficient engaging, and therefore the shoulder portion cannot sufficiently bear loads. As a result, the damage caused to the threaded portion is greater.

On the other hand, in the case of threaded joints having a threaded portion with dovetail threads in which clearances are provided as described above, specifically, a threaded portion in which clearances are provided between stabbing flanks and also between crests and roots, the occurrence of plastic deformation is delayed by the presence of the clearances during thread fastening, and thus the loads can be borne sufficiently by the shoulder portion.

Thus, threaded joints having a threaded portion in which clearances are provided are capable of providing better sealing performance than threaded joints having a threaded portion in which clearances are not provided.

Even in the case of threaded joints having a threaded portion in which clearances are provided, if they are to be subjected to excessive internal pressure and external pressure, it is preferred that they are provided with two separate seal portions, i.e., an internal seal portion for internal pressure and an external seal portion for external pressure, rather than with a single seal portion (see threaded joint of Patent Literature 2). The reason is that, when two separate seal portions are provided, sealing against internal pressure and sealing against external pressure can be effectively performed separately by the respective seal portions, and therefore the sealing performance can be further ensured.

In this regard, the threaded joint of Patent Literature 2, as described above, is provided with only one seal portion, being disposed adjacent the shoulder portion. If two seal portions were to be provided in the threaded joint of Patent Literature 2, the internal seal portion and the external seal portion would be provided on two sides with the shoulder portion interposed there between so that they are adjacent to the shoulder portion. Thus, the internal seal portion and the external seal portion would be close to each other.

However, in the case of a threaded joint in which the internal seal portion and the external seal portion are located close to each other, the contact at the internal seal portion and the contact at the external seal portion interact with each other during thread fastening, so that the sealing surfaces of each seal portion are not brought into sufficient intimate contact. As a result, the interference fit at each seal portion becomes insufficient, and therefore the sealing performance cannot be exhibited appropriately.

Thus, the state in which the internal seal portion and the external seal portion are close to each other is not appropriate, and the distance between the internal seal portion and the external seal portion needs to be long to some extent. When a sufficient length is provided between the internal seal portion and the external seal portion, the interaction between the contact at the internal seal portion and the contact at the external seal portion during thread fastening is reduced. Consequently, the intimate contact between the sealing surfaces at each seal portion becomes sufficient, and therefore it is possible to reliably provide excellent sealing performance.

Furthermore, providing a sufficient length between the internal seal portion and the external seal portion results in forming a sufficiently long rigid portion in the pin and the box between the two seal portions. The rigid portions act to effect uniform radial expansion or radial contraction of the regions of the seal portions when pressure has been applied. This effect inhibits the occurrence of flexure of each sealing surface, so that improvement of the sealing performance can be expected.

This configuration may seemingly raise a concern that, when an excessive compressive load has been applied to the threaded joint, the sealing surfaces both at the internal seal portion and at the external seal portion can become misaligned relative to each other in a pipe axis direction and therefore that the sealing performance may be compromised. However, since the shoulder portion is disposed between the internal seal portion and the external seal portion and this shoulder portion bears compressive loads, misalignment between the sealing surfaces in a pipe axis direction does not occur so that the sealing performance is not compromised.

The threaded joint for steel pipes of the present invention has been made based on the above findings. Embodiments of the threaded joint for steel pipes according to the present invention are described below.

Figure 2:
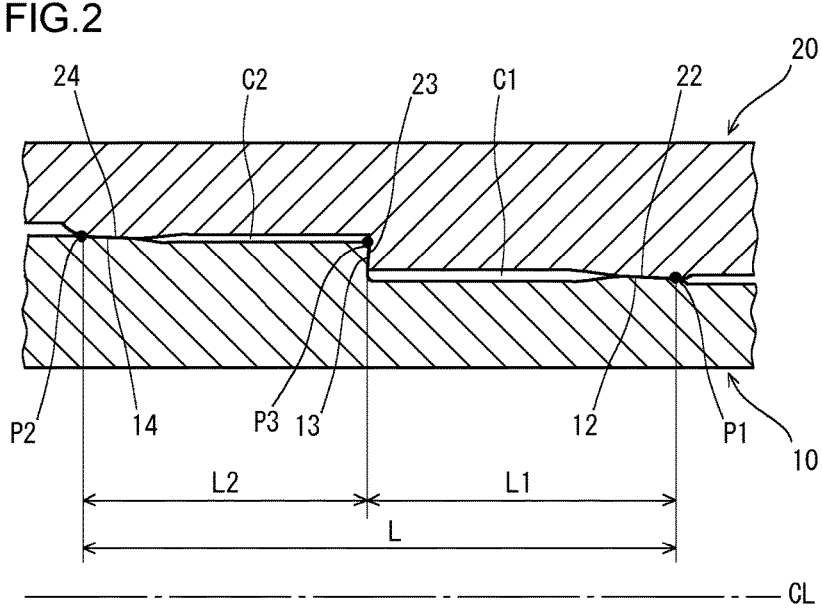
FIG. 2 is an enlarged longitudinal sectional view of the threaded joint for steel pipes shown in FIG. 1, illustrating a vicinity of the boundary between two stepwise threaded portions.

FIG. 1 is a longitudinal sectional view of a threaded joint for steel pipes according to an embodiment of the present invention. FIG. 2 is an enlarged longitudinal sectional view of the threaded joint for steel pipes shown in FIG. 1, illustrating a vicinity of the boundary between two stepwise threaded portions. As shown in FIGS. 1 and 2, the threaded joint according to the present embodiment is an integral-type threaded joint and is constructed of a pin 10 and a box 20. However, the threaded joint of the present embodiment may also be employed as a coupling-type threaded joint.

The threaded joint of the present embodiment is configured such that the outside diameter of the box 20 is substantially equal to the outside diameter of the pin 10. Thus, the outside diameter of the box 20 is in a range of 100% to less than 110% of the outside diameter of the tubular body having the pin 10.

The pin 10 includes, in order from the free end of the pin 10 toward the tubular body: a first male threaded portion 11, a first sealing surface 12, a shoulder surface 13, a second sealing surface 14, and a second male threaded portion 15. Both the first sealing surface 12 and the second sealing surface 14 are tapered surfaces. Technically, the first sealing surface 12 and the second sealing surface 14 each have a shape corresponding to a shape of the peripheral surface of a truncated cone decreasing in diameter toward the end of the pin 10, or a shape corresponding to a combined shape of the peripheral surface of a truncated cone and the peripheral surface of revolution that can be obtained by rotating a curved line such as an arc about the pipe axis CL.

The shoulder surface 13 is an annular surface generally perpendicular to the pipe axis CL. FIGS. 1 and 2 show a state in which the shoulder surface 13 is slightly inclined with respect to a plane perpendicular to the pipe axis CL toward the direction in which the pin 10 is screwed. That is, they show a state in which the outer side of the shoulder surface 13 is slightly closer to the free end of the pin 10 than the inner side thereof.

The box 20 includes, in order from the side adjacent the tubular body having the box 20 toward the free end thereof: a first female threaded portion 21, a first sealing surface 22, a shoulder surface 23, a second sealing surface 24, and a second female threaded portion 25. The first female threaded portion 21, first sealing surface 22, shoulder surface 23, second sealing surface 24, and second female threaded portion 25, of the box 20, are provided to correspond to the first male threaded portion 11, first sealing surface 12, shoulder surface 13, second sealing surface 14, and second male threaded portion 15, of the pin 10, respectively.

The first male threaded portion 11 of the pin 10 and the first female threaded portion 21 of the box 20 are tapered threaded portions with dovetail threads that can mesh with each other, and constitute a first threaded portion located at an inner position (inner threaded portion). The second male threaded portion 15 of the pin 10 and the second female threaded portion 25 of the box 20 are also tapered threaded portions with dovetail threads that can engage with each other, and constitute a second threaded portion located at an outer position (outer threaded portion).

Figure 3:
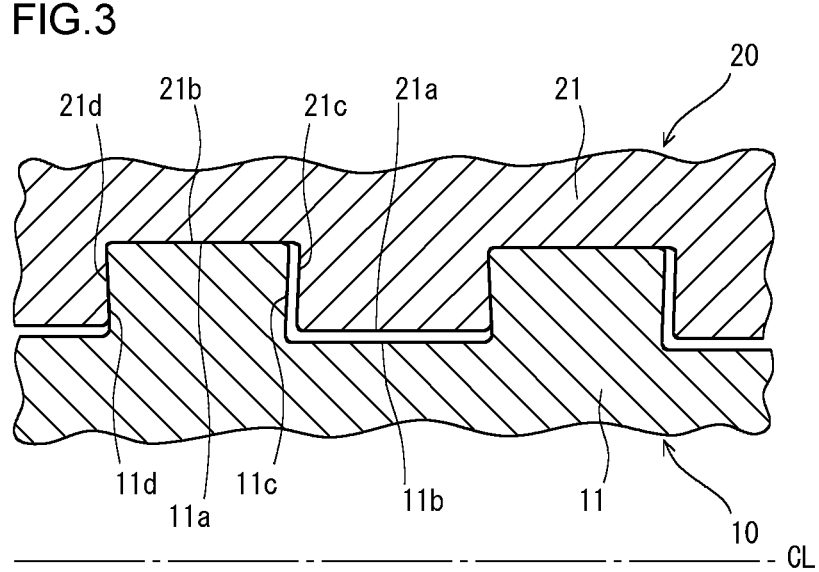
FIG. 3 is an enlarged longitudinal sectional view of the threaded joint for steel pipes shown in FIG. 1, illustrating a first threaded portion thereof.
Figure 4:
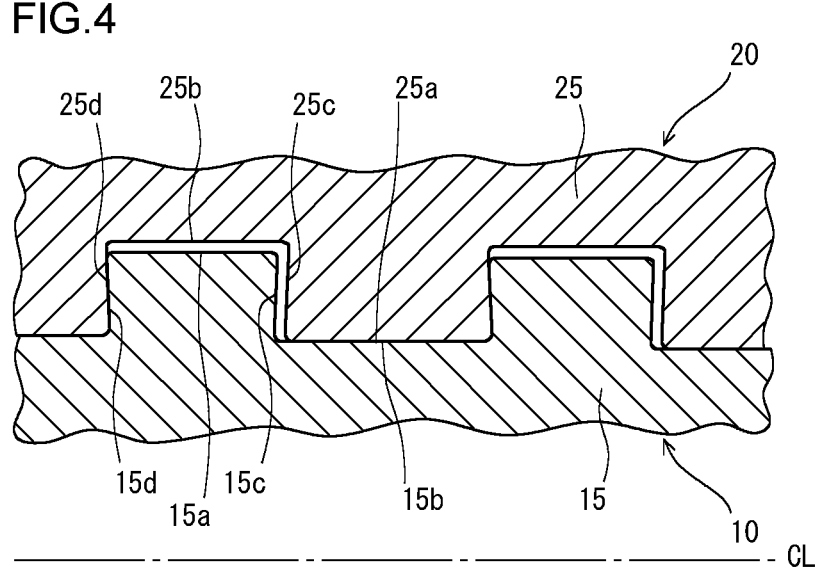
FIG. 4 is an enlarged longitudinal sectional view of the threaded joint for steel pipes shown in FIG. 1, illustrating a second threaded portion thereof.

FIGS. 3 and 4 are enlarged longitudinal sectional views of the threaded joint for steel pipes shown in FIG. 1, illustrating the threaded portions thereof. Of these, FIG. 3 shows the first threaded portion and FIG. 4 shows the second threaded portion.

As shown in FIG. 3, with regard to the inner threaded portion, the first male threaded portion 11 of the pin 10 includes crests 11a, roots 11b, stabbing flanks 11c which are in leading positions in screwing, and load flanks 11d located opposite from the stabbing flanks 11c. The first female threaded portion 21 of the box 20 includes crests 21a which face the roots 11b of the first male threaded portion 11, roots 21b which face the crests 11a of the first male threaded portion 11, stabbing flanks 21c which face the stabbing flanks 11c of the first male threaded portion 11, and load flanks 21d which face the load flanks 11d of the first male threaded portion 11.

As shown in FIG. 4, with regard to the outer threaded portion, the second male threaded portion 15 of the pin 10 includes crests 15a, roots 15b, stabbing flanks 15c which are in leading positions in screwing, and load flanks 15d located opposite from the stabbing flanks 15c. The second female threaded portion 25 of the box 20 includes crests 25a which face the roots 15b of the second male threaded portion 15, roots 25b which face the crests 15a of the second male threaded portion 15, stabbing flanks 25c which face the stabbing flanks 15c of the second male threaded portion 15, and load flanks 25d which face the load flanks 15d of the second male threaded portion 15.

The flank angles of the load flanks 11d, 21d and the stabbing flanks 11c, 21c of the first threaded portion and the flank angles of the load flanks 15d, 25d and the stabbing flanks 15c, 25c of the second threaded portion are all negative angles of less than 0°. The term "flank angle" as used herein means an angle formed by a flank with respect to a plane perpendicular to the pipe axis CL. In the case of the threaded joint shown in FIGS. 3 and 4, when referring to the flank angle of the load flanks 11d, 21d, 15d, 25d, clockwise angles are designated as positive angles, and when referring to the flank angle of stabbing flanks 11c, 21c, 15c, 25c, counterclockwise angles are designated as positive angles.

The first male threaded portion 11 and the first female threaded portion 21 (inner threaded portion) are threadedly engageable with each other and the second male threaded portion 15 and the second female threaded portion 25 (outer threaded portion) are threadedly engageable with each other, and in a fastened state, they engage in intimate contact with each other to have an interference fit. The first sealing surfaces 12, 22 are brought into contact with each other and the second sealing surfaces 14, 24 are brought into contact with each other, by the screwing of the pin 10, and in a fastened state, they engage in intimate contact with each other to have an interference fit. Thus, the first sealing surfaces 12, 22 form a first surface-to-surface seal portion (internal seal portion). The second sealing surfaces 14, 24 form a second surface-to-surface seal portion (external seal portion).

The shoulder surfaces 13, 23 are brought into contact and pressed against each other by the screwing of the pin 10 and serve as a stopper for restricting the screwing of the pin 10. The shoulder surfaces 13, 23 form a shoulder portion by the pressure contact against each other to serve as a stopper. In a fastened state, the shoulder surfaces 13, 23 serve to impart the so-called thread tightening axial force to the load flanks 11d, 15d of the pin 10 in the first threaded portion and the second threaded portion, and also serve to bear the load due to the reaction force.

In a fastened state, the inner threaded portion is as follows. The load flanks 11d of the first male threaded portion 11 are in contact with the load flanks 21d of the first female threaded portion 21. The crests 11a of the first male threaded portion 11 are in contact with the roots 21b of the first female threaded portion 21. Clearances are provided between the stabbing flanks 11c of the first male threaded portion 11 and the stabbing flanks 21c of the first female threaded portion 21. Clearances are provided between the roots 11b of the first male threaded portion 11 and the crests 21a of the first female threaded portion 21. Conversely to this embodiment, it is possible to employ another embodiment in which the roots 11b of the first male threaded portion 11 are in contact with the crests 21*a* of the first female threaded portion 21 while clearances are provided between the crests 11*a* of the first male threaded portion 11 and the roots 21*b* of the first female threaded portion 21.

In a fastened state, the outer threaded portion is as follows. The load flanks 15*d* of the second male threaded portion 15 are in contact with the load flanks 25*d* of the second female threaded portion 25. The roots 15*b* of the second male threaded portion 15 are in contact with the crests 25*a* of the second female threaded portion 25. Clearances are provided between the stabbing flanks 15*c* of the second male threaded portion 15 and the stabbing flanks 25*c* of the second female threaded portion 25. Clearances are provided between the crests 15*a* of the second male threaded portion 15 and the roots 25*b* of the second female threaded portion 25. Conversely to this embodiment, it is possible to employ another embodiment in which the crests 15*a* of the second male threaded portion 15 are in contact with the roots 25*b* of the second female threaded portion 25 while clearances are provided between the roots 15*b* of the second male threaded portion 15 and the crests 25*a* of the second female threaded portion 25.

Figure 5:
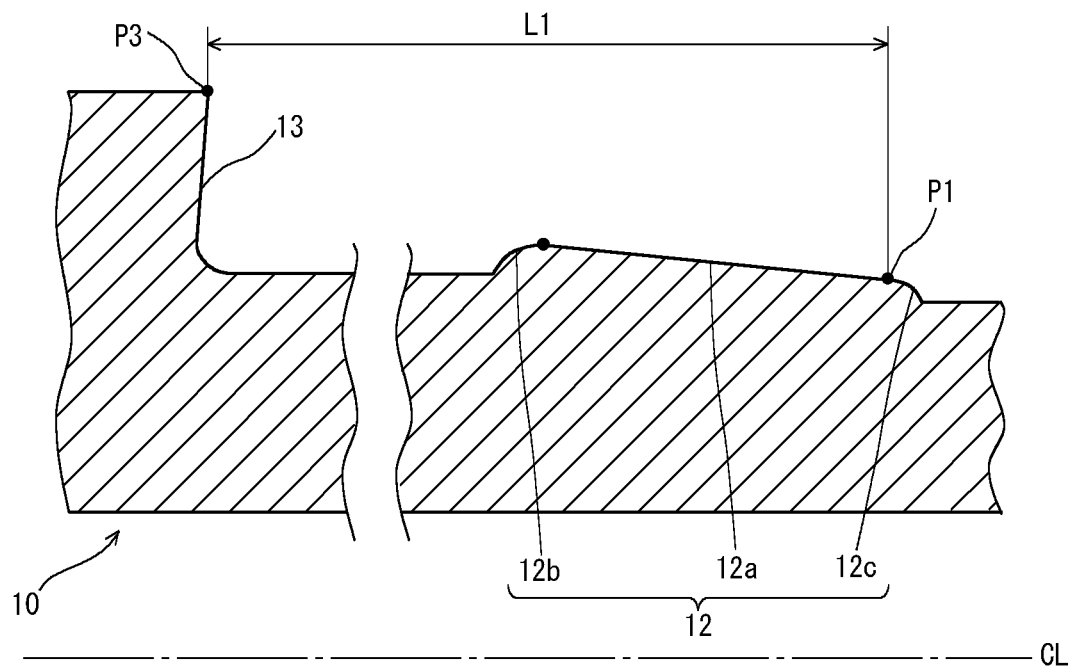
FIG. 5 is a view of positional relation of a first sealing surface and a shoulder surface in the pin of this embodiment.

FIG. 5 is a view of positional relation of the first sealing surface and the shoulder surface in the pin of this embodiment. As shown in FIG. 5. the first sealing surface 12 of the pin 10 comprises a first tapered surface 12*a* and a first curved surface 12*b*, 12*c*. The first curved surface 12*b*, 12*c* are located at both ends of the first tapered surface 12*a*. A position P1 is a boundary between the first tapered surface 12*a* and the first curved surface 12*c* at the near side of the end of the pin 10. A position P3 is a position of maximum diameter of the shoulder surface 13 of the pin 10. A length L1 along the pipe axis is at least 15 mm, the length L1 along the pipe axis being defined as a distance from the position P1 to the position P3.

Figure 6:
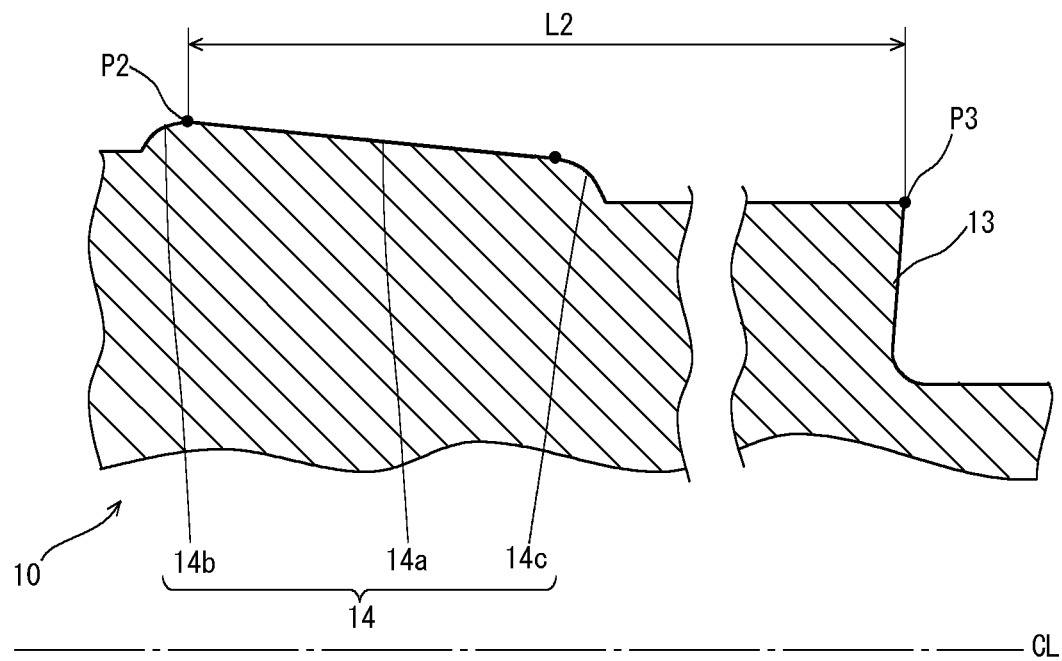
FIG. 6 is a view of positional relation of a second sealing surface and a shoulder surface in the pin of this embodiment.

FIG. 6 is a view of positional relation of the second sealing surface and the shoulder surface in the pin of this embodiment. As shown in FIG. 6. the second sealing surface 14 of the pin 10 comprises a second tapered surface 14*a* and a second curved surface 14*b*, 14*c*. The second curved surface 14*b*, 14*c* are located at both ends of the second tapered surface 14*a*. A position P2 is a boundary between the second tapered surface 14*a* and the second curved surface 14*b* at the near side of the tubular body of the pin 10. A length L2 along the pipe axis is at least 15 mm, the length L2 along the pipe axis being defined as a distance from the position P2 to the position P3. The total length L which is a sum of the length L1 and the length L2 is at least 50 mm.

In short, in the present embodiment, the internal seal portion (first seal portion) is formed by surface-to-surface contact with the first sealing surface 12 of the pin 10 and the first sealing surface 22 of the box 20. The location of the internal seal portion is defined by the position P1 that is the boundary between the first tapered surface 12*a* of the first sealing surface 12 of the pin 10 and the first curved surface 12*c* thereof. The location of the external seal portion is defined by the position P2 that is the boundary between the second tapered surface 14*a* of the second sealing surface 14 of the pin 10 and the second curved surface 14*b* thereof. Furthermore, the shoulder portion is provided between the internal seal portion and the external seal portion. The location of the shoulder portion is defined by the position P3 on the shoulder surface 13 of the pin 10. The length along the pipe axis between the internal seal portion and the external seal portion is long to some extent, as the length corresponds to the total length L which is a sum of the length L1 from the position P1 of the internal seal portion to the position P3 of the shoulder portion and the length L2 from the position P2 of the external seal portion to the position P3 of the shoulder portion.

As shown in FIG. 2, the pin 10 and the box 20 do not contact each other between the internal seal portion and the shoulder portion with a clearance C1 provided therein. Likewise, the pin 10 and the box 20 do not contact each other between the external seal portion and the shoulder portion with a clearance C2 provided therein.

As described above, the threaded joint for steel pipes of the present embodiment is configured such that two separate threaded portions with dovetail threads are provided, and between them, the internal seal portion, the shoulder portion, and the external seal portion are provided in sequence, and a sufficient length between the internal seal portion and the external seal portion is ensured. Furthermore, in the threaded portions, clearances are provided between the stabbing flanks, and further, clearances are provided between the crests and the roots. By virtue of this configuration, the threaded joint of the present embodiment reliably provides excellent sealing performance against internal pressure and external pressure.

The following are supplementary descriptions regarding preferred embodiments of the principal parts.

[Length L Between Internal Seal Portion And External Seal Portion]

The length L between the internal seal portion and the external seal portion is at least 50 mm. If the length L is less than 50 mm, the contact at the internal seal portion and the contact at the external seal portion interact with each other during thread fastening, so that the sealing performance cannot be exhibited appropriately. A preferred lower limit of the length L is 55 mm.

On the other hand, the upper limit of the length L is not particularly limited. However, too long a length L results in disadvantages as follows. Because the length of the joint portion as a whole is increased, the manufacturing costs will be increased. In addition, the increase in the length of the joint portion as a whole leads to an increase in pressure loaded areas, and therefore the joint portion is more likely to undergo plastic deformation and there is a danger of failure in corrosive environments. Thus, a preferred upper limit of the length L is 90 mm in order to avoid these disadvantages. A more preferred upper limit of the length L is 80 mm.

[Lengths L1 and L2 Between Seal Portions (Internal Seal Portion and External Seal Portion) and Shoulder Portion]

The length L1 between the internal seal portion and the shoulder portion and the length L2 between the external seal portion and the shoulder portion are set in relation to the length L between the internal seal portion and the external seal portion, with each being at least 15 mm. If the lengths L1 and L2 are less than 15 mm, it is difficult to provide sufficient sealing surfaces. A preferred lower limit of the lengths L1 and L2 is 20 mm.

[Shoulder Portion]

The angle formed by the shoulder surfaces with respect to the pipe axis in a longitudinal section along the pipe axis is preferably 75 to 105°. If the angle is less than 75°, the shoulder surfaces are greatly inclined away from a plane perpendicular to the pipe axis toward the direction in which the pin is screwed, and they are in a state of pressure contact in a hooked manner. Thus, the shoulder portion is more likely to undergo plastic deformation, resulting in unstable sealing performance. A more preferred lower limit of the angle of the shoulder surfaces is 85°.

On the other hand, if the angle is greater than 105°, the shoulder surfaces are in a state of being greatly inclined away from a plane perpendicular to the pipe axis toward the direction opposite to the direction in which the pin is screwed. As a result, with the pressure contact between the shoulder surfaces, a force is exerted to cause the pin to contract radially and also a force is exerted to cause the box to expand radially, which results in a decrease in the contact pressure between the sealing surfaces. A more preferred upper limit of the angle of the shoulder surfaces is 95°. An optimum angle of the shoulder surfaces is 90°. When the angle of the shoulder surfaces is 90°, the sealing performance is stabilized, and also, the machining of the shoulder portion is facilitated.

If the shoulder surfaces of the pin and the box are too small in width, they are unable to sufficiently bear the loads, and thus resistance to compressive forces is decreased. Therefore, the widths of the shoulder surfaces of the pin and the box are preferably at least 10% of the wall thicknesses of the respective tubular bodies, and more preferably at least 15% thereof.

[Seal Portion (Internal Seal Portion and External Seal Portion)]

When one of the pin and the box has too large a wall thickness in the regions of the seal portions, the other accordingly has a thinner wall thickness and thus has reduced stiffness. The pin or the box having reduced stiffness has reduced pressure resistance. Accordingly, the wall thickness of the pin and the wall thickness of the box in the regions of the seal portions are each preferably within the range of 45% to 80% of the wall thickness of the corresponding tubular body. A preferred lower limit of each wall thickness is 10.5 mm. A preferred upper limit of each wall thickness is 17 mm.

If the taper of the sealing surfaces is too steep, sealing performance will be decreased when tensile loads are applied. On the other hand, if the taper of the sealing surfaces is too gradual, the manufacturing costs will be increased because of the increased length of the seal portions as a whole. Accordingly, the taper angle of the sealing surfaces is preferably 2 to 10° with respect to the pipe axis. A more preferred lower limit of the taper angle of the sealing surfaces is 3°. A more preferred upper limit of the taper angle of the sealing surfaces is 7°.

[Threaded Portions (Inner Threaded Portion and Outer Threaded Portion)]

If the taper of the threaded portions is too steep, the torque performance will be significantly degraded because the overall lengths of the threaded portions are excessively shortened. On the other hand, if the taper of the threaded portions is too gradual, the manufacturing costs will be increased because the overall lengths of the threaded portions are increased. Accordingly, the taper angle of the threaded portions is preferably 1.5 to 4° with respect to the pipe axis. A more preferred lower limit of the taper angle of the threaded portions is 2.0°. A more preferred upper limit of the taper angle of the threaded portions is 3.6°.

The clearances between the crests and roots in the threaded portions are preferably in a range of 0.10 mm to less than 0.20 mm. If the clearances in the threaded portions are less than 0.10 mm, plastic deformation of the threaded portions begins earlier during thread fastening and therefore loads are not sufficiently borne by the shoulder portion. A more preferred lower limit of the clearances in the threaded portions is 0.12 mm. On the other hand, if the clearances of the threaded portions are not less than 0.20 mm, sealing performance, particularly of the internal seal portion, will be degraded. A more preferred upper limit of the clearances of the threaded portions is 0.16 mm. The above ranges for the clearances in the threaded portions also apply to the clearances between the stabbing flanks.

For practical use, the threaded portions are each preferably a single-start thread or a double-start thread.

The present invention is not limited to the embodiments described above, and various modifications may be made without departing from the spirit and scope of the present invention.

The sealing surfaces, which constitute the above-described surface-to-surface seal portions (internal seal portion and external seal portion), are formed together with the other portions in a series of machining operations. In the operations, the tool feed rate for machining the sealing surfaces is set to be lower than the feed rate for machining the other portions. This makes the sealing surfaces much smoother than the machined surfaces of the other portions.

Figure 7:
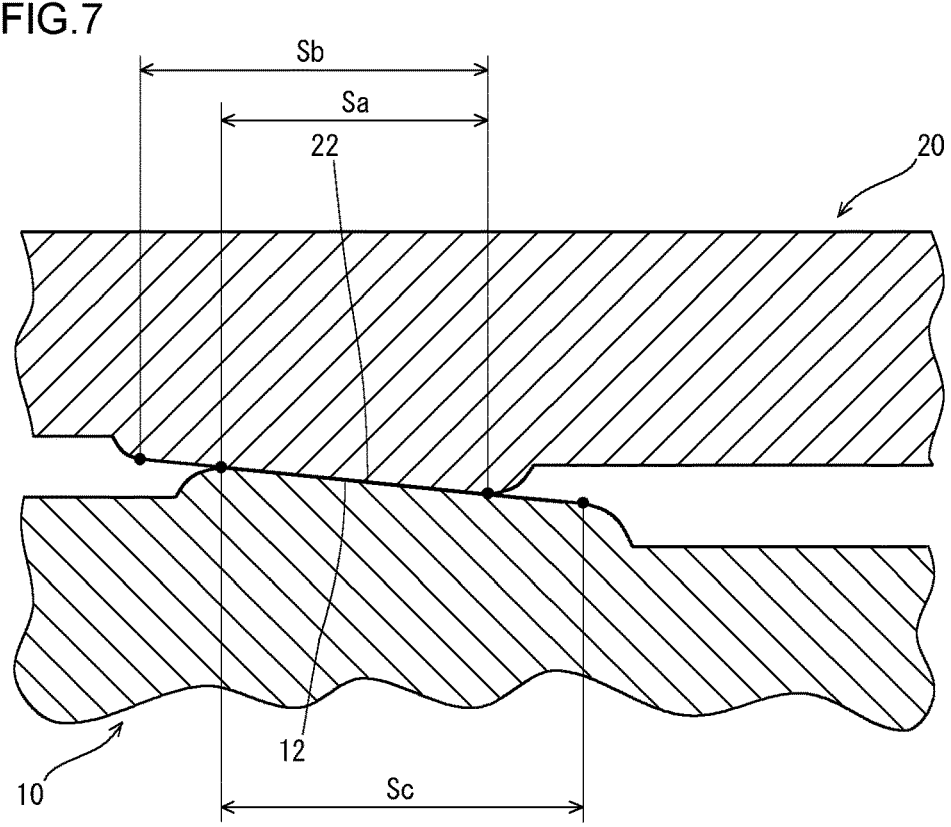
FIG. 7 is a longitudinal sectional view schematically showing a region including a surface-to-surface internal seal portion.
Figure 8:
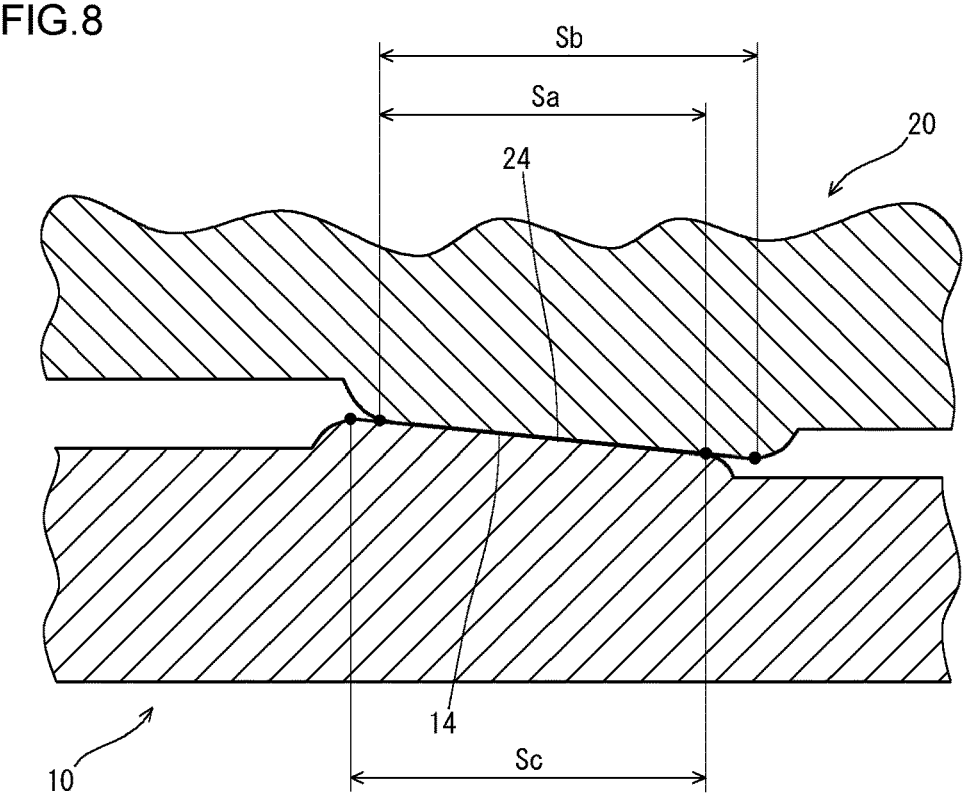
FIG. 8 is a longitudinal sectional view schematically showing a region including a surface-to-surface external seal portion.

FIG. 7 and FIG. 8 are a longitudinal sectional view schematically showing the region of the surface-to-surface seal portion. The internal seal portion (first seal portion) is illustrated in FIG. 7. The external seal portion (second seal portion) is illustrated in FIG. 8. As shown in FIG. 7, the internal seal portion refers to a region Sa where the first sealing surfaces 12, 22 contact each other in a fastened state. The length of the internal seal portion along the pipe axis is preferably 1 to 7 mm. In the meantime, the first sealing surfaces 12, 22 do not refer only to the region Sa where they contact each other in a fastened state but to the entireties of regions Sb, Sc that have been machined to smooth surfaces as sealing surfaces. The region Sc corresponds to the first tapered surface 12a of the pin 10 described above. That is, the first sealing surfaces 12, 22 are regions where they contact and slide relative to each other (including regions where the sliding may occur) during thread fastening, and they include the entireties of the regions Sb, Sc machined to a surface roughness comparable to that of the region Sa where they contact each other in a fastened state. The same applies to the external seal portion shown in FIG. 8.

The seal portions can be identified by removing the pin 10 from the box 20 and observing the sealing surfaces. The sealing surfaces have marks (portions where strong sliding occurred), left on them, of the seal portions (the contact region Sa in a fastened state).

Examples

To verify the advantages of the present invention, a numerical simulation and analysis was carried out using the elasto-plastic finite element method.

Test Conditions

In the FEM analysis, models of the integral-type threaded joint for steel pipes shown in FIG. 1 were prepared. Among these models, the length L1 between the internal seal portion and the shoulder portion and the length L2 between the external seal portion and the shoulder portion were varied. As a result of the variations, the length L between the internal seal portion and the external seal portion were varied. In addition, the angle of the shoulder surfaces was varied.

As a conventional example for comparison, the following model was prepared. The model joint of the conventional example was provided with an internal seal portion disposed adjacent the free end of the pin and an external seal portion disposed adjacent the free end of the box. Two stepwise tapered threaded portions with buttress threads were provided in regions between the internal seal portion and the external seal portion, and a shoulder portion was provided at the boundary between the two stepwise threaded portions.

The representative dimensions of each model are shown in Tables 1 to 3 below. Of these tables, Table 2 shows dimensions of the pin and Table 3 shows dimensions of the box.

TABLE 1

| No. | Length between seal and shoulder [mm] | | Length L between internal seal and external seal [mm] | Shoulder Angle [°] | Classification |
|---|---|---|---|---|---|
| | External seal length L2 | Internal seal length L1 | | | |
| 1 | 98.09 | 98.09 | 196.18 | 90 | Conv. Ex. |
| 2 | 15 | 15 | 30* | 75, 80, 85, 90, 95 | Comp. Ex. |
| 3 | 20 | 20 | 40* | 75, 80, 85, 90, 95 | Comp. Ex. |
| 4 | 25 | 25 | 50 | 75, 80, 85, 90, 95 | Inv. Ex. |
| 5 | 30 | 30 | 60 | 75, 80, 85, 90, 95 | Inv. Ex. |
| 6 | 35 | 35 | 70 | 75, 80, 85, 90, 95 | Inv. Ex. |
| 7 | 40 | 40 | 80 | 75, 80, 85, 90, 95 | Inv. Ex. |
| 8 | 45 | 45 | 90 | 75, 80, 85, 90, 95 | Inv. Ex. |
| 9 | 50 | 50 | 100 | 75, 80, 85, 90, 95 | Inv. Ex. |

Remarks)
The symbol "*" indicates that the value does not satisfy the condition specified by the present invention.

TABLE 2

| | Pin Seal | | Pin Thread | | | | | |
|---|---|---|---|---|---|---|---|---|
| No. | External seal maximum diameter [mm] | Internal seal minimum diameter [mm] | Taper Angle [°] | Taper Angle [°] | Thread pitch [mm] | Thread height [mm] | Thread clearance [mm] | Classification |
| 1 | 353.3 | 328.028 | 9.46 | 1.79 | 5.08 | 1.55 | 0.48 | Conv. Ex. |
| 2 | 343.48 | 334.53 | 4.76 | 2.86 | 8.47 | 1.55 | 0.12 | Comp. Ex. |
| 3 | 343.48 | 334.53 | 4.76 | 2.86 | 8.47 | 1.55 | 0.12 | Comp. Ex. |
| 4 | 343.48 | 334.53 | 4.76 | 2.86 | 8.47 | 1.55 | 0.12 | Inv. Ex. |
| 5 | 343.48 | 334.53 | 4.76 | 2.86 | 8.47 | 1.55 | 0.12 | Inv. Ex. |
| 6 | 343.48 | 334.53 | 4.76 | 2.86 | 8.47 | 1.55 | 0.12 | Inv. Ex. |
| 7 | 343.48 | 334.53 | 4.76 | 2.86 | 8.47 | 1.55 | 0.12 | Inv. Ex. |
| 8 | 343.48 | 334.53 | 4.76 | 2.86 | 8.47 | 1.55 | 0.12 | Inv. Ex. |
| 9 | 343.48 | 334.53 | 4.76 | 2.86 | 8.47 | 1.55 | 0.12 | Inv. Ex. |

TABLE 3

| | Box Seal | | Box Thread | | | | | |
|---|---|---|---|---|---|---|---|---|
| No. | External seal maximum diameter [mm] | Internal seal minimum diameter [mm] | Taper Angle [°] | Taper Angle [°] | Thread pitch [mm] | Thread height [mm] | Thread clearance [mm] | Classification |
| 1 | 352.33 | 327.058 | 9.46 | 1.79 | 5.08 | 1.55 | 0.48 | Conv. Ex. |
| 2 | 342.48 | 333.53 | 4.76 | 2.86 | 8.47 | 1.65 | 0.12 | Comp. Ex. |
| 3 | 342.48 | 333.53 | 4.76 | 2.86 | 8.47 | 1.65 | 0.12 | Comp. Ex. |
| 4 | 342.48 | 333.53 | 4.76 | 2.86 | 8.47 | 1.65 | 0.12 | Inv. Ex. |
| 5 | 342.48 | 333.53 | 4.76 | 2.86 | 8.47 | 1.65 | 0.12 | Inv. Ex. |
| 6 | 342.48 | 333.53 | 4.76 | 2.86 | 8.47 | 1.65 | 0.12 | Inv. Ex. |
| 7 | 342.48 | 333.53 | 4.76 | 2.86 | 8.47 | 1.65 | 0.12 | Inv. Ex. |
| 8 | 342.48 | 333.53 | 4.76 | 2.86 | 8.47 | 1.65 | 0.12 | Inv. Ex. |
| 9 | 342.48 | 333.53 | 4.76 | 2.86 | 8.47 | 1.65 | 0.12 | Inv. Ex. |

Additional common conditions were as follows.
Steel pipe size: 14 [inch], 115[lb/ft] (outside diameter of 355.6 mm, inside diameter of 314.35 mm, and wall thickness of 20.625 mm).
Grade of steel pipe: API standard Q125 (carbon steel having a yield strength of 125 ksi (862 MPa)).
Evaluation Method
In the FEM analysis, a load sequence which simulated that in an ISO 13679 Series A test was sequentially applied to each model in a fastened state. The sealing performance against external pressure was evaluated by comparing the minimum values of the seal contact force [N/mm], i.e., "average contact pressure between the sealing surfaces"× "contact width", of the external seal portions (second seal portions) under the load. It is noted that the higher the value of the contact force, the better the sealing performance of the seal portion. Likewise, the sealing performance against internal pressure of the internal seal portion (first seal portion) was evaluated by comparing the seal contact force.

Test Results

The test results are shown in Table 4 below.

TABLE 4

| | Seal Contact force [N/mm] | | | | | | | | | | |
|---|---|---|---|---|---|---|---|---|---|---|---|
| | Shoulder Angle 75° | | Shoulder Angle 80° | | Shoulder Angle 85° | | Shoulder Angle 90° | | Shoulder Angle 95° | | |
| No. | Ex. Seal | In. Seal | Ex. Seal | In. Seal | Ex. Seal | In. Seal | Ex. Seal | In. Seal | Ex. Seal | In. Seal | Classification |
| 1 | — | — | — | — | — | — | 0 | 0 | — | — | Conv. Ex. |
| 2 | 0 | 0 | 0 | 0 | 0 | 0 | 0 | 0 | 0 | 0 | Comp. Ex. |
| 3 | 0 | 0 | 0 | 0 | 0 | 0 | 0 | 0 | 0 | 0 | Comp. Ex. |
| 4 | 724 | 112 | 746 | 138 | 750 | 170 | 735 | 201 | 731 | 218 | Inv. Ex. |
| 5 | 665 | 381 | 699 | 433 | 721 | 474 | 712 | 510 | 699 | 429 | Inv. Ex. |
| 6 | 559 | 341 | 606 | 396 | 646 | 459 | 671 | 518 | 640 | 472 | Inv. Ex. |
| 7 | 542 | 419 | 605 | 481 | 649 | 526 | 665 | 522 | 636 | 454 | Inv. Ex. |
| 8 | 567 | 480 | 642 | 532 | 649 | 575 | 659 | 577 | 677 | 513 | Inv. Ex. |
| 9 | 614 | 536 | 675 | 577 | 722 | 613 | 725 | 620 | 735 | 567 | Inv. Ex. |

As shown in Table 4, the inventive examples of Test Nos. 4 to 9, which satisfy all conditions specified by the present invention, exhibited much higher contact force of the external seal portion and the internal seal portion than the conventional example of Test No. 1 and the comparative examples of Test Nos. 2 and 3, which do not satisfy each of the conditions specified by the present invention. This tendency was also observed when the angle of the shoulder surfaces was varied in the range of 75° to 95°. These results demonstrate that, by employing a threaded joint for steel pipes of the present invention, it is possible to reliably improve sealing performance against internal pressure and external pressure.

INDUSTRIAL APPLICABILITY

A threaded joint of the present invention is capable of being effectively utilized in connection of steel pipes that are used as OCTG

REFERENCE SIGNS LIST

10: pin,
11: first male threaded portion,
11a: crest of first male threaded portion,
11b: roots of first male threaded portion,
11c: stabbing flank of first male threaded portion,
11d: load flank of first male threaded portion,
12: first sealing surface,
12a: first tapered surface,
12b, 12c: first curved surface,
13: shoulder surface,
14: second sealing surface,
14a: second tapered surface,
14b, 14c: second curved surface,
15: second male threaded portion,
15a: crest of second male threaded portion,
15b: root of second male threaded portion,
15c: stabbing flank of second male threaded portion,
15d: load flank of second male threaded portion,
20: box,
21: first female threaded portion,
21a: crest of first female threaded portion,
21b: root of first female threaded portion,
21c: stabbing flank of first female threaded portion,
21d: load flank of first female threaded portion,
22: first sealing surface,
23: shoulder surface,
24: second sealing surface,
25: second female threaded portion,
25a: crest of second female threaded portion,
25b: root of second female threaded portion,
25c: stabbing flank of second female threaded portion,
25d: load flank of second female threaded portion,
L: length between first seal portion and second seal portion,
L1: length from first seal portion to shoulder portion,
L2: length from second seal portion to shoulder portion,
P1: position between the first tapered surface of the pin and the first curved surface thereof,
P2: position between the second tapered surface of the pin and the second curved surface thereof,
P3: position of maximum diameter of the shoulder surface of the pin,
C1: clearance, C2: clearance, CL: pipe axis.

The invention claimed is:

1. A threaded joint for steel pipes, comprising: a tubular pin and a tubular box, the pin and the box being fastened by screwing the pin onto the box, wherein:

the box has an outside diameter less than 110% of an outside diameter of a tubular body having the pin, the pin comprises, in order from an end of the pin toward the tubular body: a tapered first male threaded portion with dovetail threads; a first sealing surface; a shoulder surface; a second sealing surface; and a tapered second male threaded portion with dovetail threads, the first sealing surface comprises: a first tapered surface; and first curved surfaces at both ends of the first tapered surface, the second sealing surface comprises: a second tapered surface; and second curved surfaces at both ends of the second tapered surface, a length L1 along the pipe axis is a distance from a boundary between the first tapered surface and the first curved surface at the near side of the end of the pin to the shoulder surface, the length L1 along the pipe axis being at least 15 mm, a length L2 along the pipe axis is a distance from a boundary between the second tapered surface and the second curved surface at the near side of the tubular body of the pin to the shoulder surface, the length L2 along the pipe axis being at least 15 mm, a total length L which is a sum of the length L1 and the length L2 is at least 50 mm, the box comprises, in order from the tubular body toward an end of the box: a tapered first female threaded portion with dovetail threads; a first sealing surface; a shoulder surface; a second sealing surface; and a tapered second female threaded portion with dovetail threads, in a fastened state, the shoulder surfaces are in contact with each other, the first sealing surfaces are in contact with each other, and the second sealing surfaces are in contact with each other, clearances are provided between stabbing flanks of the first male threaded portion and stabbing flanks of the first female threaded portion; and clearances are provided between roots of the first male threaded portion and crests of the first female threaded portion or between crests of the first male threaded portion and roots of the first female threaded portion, clearances are provided between stabbing flanks of the second male threaded portion and stabbing flanks of the second female threaded portion; and clearances are provided between roots of the second male threaded portion and crests of the second female threaded portion or between crests of the second male threaded portion and roots of the second female threaded portion, and wherein an angle formed by the shoulder surfaces with respect to the pipe axis in a longitudinal section along the pipe axis is between 75° and 105°, each of the shoulder surfaces being a single plane surface that intersects with a pipe axis direction.

2. The threaded joint for steel pipes according to claim 1, wherein, each of the clearances between the crests and the roots is in a range of 0.10 mm to less than 0.20 mm.

3. The threaded joint for steel pipes according to claim 1, wherein, the total length L is at most 90 mm.

4. The threaded joint for steel pipes according to claim 1, wherein, a first threaded portion is constituted by the first male threaded portion and the first female threaded portion, and a second threaded portion is constituted by the second male threaded portion and the second female threaded portion, the first threaded portion and the second threaded portion each comprising a single-start thread or a double-start thread.

5. The threaded joint for steel pipes according to claim 2, wherein, the total length L is at most 90 mm.

6. The threaded joint for steel pipes according to claim 2, wherein, a first threaded portion is constituted by the first male threaded portion and the first female threaded portion, and a second threaded portion is constituted by the second male threaded portion and the second female threaded portion, the first threaded portion and the second threaded portion each comprising a single-start thread or a double-start thread.

7. The threaded joint for steel pipes according to claim 3, wherein, a first threaded portion is constituted by the first male threaded portion and the first female threaded portion, and a second threaded portion is constituted by the second male threaded portion and the second female threaded portion, the first threaded portion and the second threaded portion each comprising a single-start thread or a double-start thread.

8. The threaded joint for steel pipes according to claim 5, wherein, a first threaded portion is constituted by the first male threaded portion and the first female threaded portion, and a second threaded portion is constituted by the second male threaded portion and the second female threaded portion, the first threaded portion and the second threaded portion each comprising a single-start thread or a double-start thread.

* * * * *